(12) United States Patent
Tada et al.

(10) Patent No.: US 12,496,090 B2
(45) Date of Patent: Dec. 16, 2025

(54) MEDICAL DEVICE

(71) Applicant: TERUMO KABUSHIKI KAISHA, Tokyo (JP)

(72) Inventors: Yuichi Tada, Santa Clara, CA (US); Yoichiro Kuwano, Tokyo (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 364 days.

(21) Appl. No.: 18/076,311

(22) Filed: Dec. 6, 2022

(65) Prior Publication Data

US 2023/0200842 A1 Jun. 29, 2023

(30) Foreign Application Priority Data

Dec. 28, 2021 (JP) .................. 2021-213848

(51) Int. Cl.
A61B 17/3207 (2006.01)
A61B 17/00 (2006.01)

(52) U.S. Cl.
CPC .......... A61B 17/320758 (2013.01); A61B 2017/00022 (2013.01); A61B 2217/005 (2013.01)

(58) Field of Classification Search
CPC .......... A61B 2017/00022; A61B 2017/00075; A61B 2017/00123; A61B 2017/22079; A61B 2017/22042; A61B 2017/00017; A61B 2017/00685; A61B 2017/320775; A61B 2017/22094; A61B 2017/32007; A61B 2217/005; A61B 2217/007; A61B 2090/3937; A61B 2090/0811; A61B 2090/065; A61B 2090/064; A61B 2090/066; A61B 17/320758; A61B 17/320068; A61B 17/3207; A61B 17/32002

See application file for complete search history.

(56) References Cited

U.S. PATENT DOCUMENTS

2008/0221601 A1* 9/2008 Huynh .......... A61B 17/320758 606/159
2010/0292721 A1 11/2010 Moberg
2014/0261453 A1* 9/2014 Carlson ................. A61B 34/37 128/849
2015/0375327 A1* 12/2015 Becker ..................... G06T 1/00 219/130.01

(Continued)

FOREIGN PATENT DOCUMENTS

JP 5281195 A 9/2013

Primary Examiner — Katherine H Schwiker
Assistant Examiner — Lauren Dubose
(74) Attorney, Agent, or Firm — Kim & Stewart LLP

(57) ABSTRACT

A medical device for removing an object in a body cavity, includes a rotatable drive shaft, a cutter attached to a distal end of the drive shaft and by which the object is cut, a guide wire including one or more markers, a guide tube disposed at a distal portion of the drive shaft and including a lumen through which the guide wire can pass and a sensor configured to detect the one or more markers, and a controller configured to control an operation state of the cutter to be an operation disabled state in which the cutter cannot operate and an operation enabled state in which the cutter can operate, and to switch between the operation disabled state and the operation enabled state according to the one or more markers detected by the sensor.

14 Claims, 7 Drawing Sheets

(56) References Cited

U.S. PATENT DOCUMENTS

| | | | |
|---|---|---|---|
| 2018/0221055 A1* | 8/2018 | Grace | A61L 31/10 |
| 2019/0262033 A1* | 8/2019 | Tada | A61B 17/3207 |
| 2020/0397463 A1* | 12/2020 | Spangler | A61B 17/22 |
| 2022/0175269 A1* | 6/2022 | Lu | A61B 5/6851 |

* cited by examiner

MEDICAL DEVICE

CROSS-REFERENCE TO RELATED APPLICATION(S)

This application is based on and claims the benefit of priority from Japanese patent application No. 2021-213848, filed Dec. 28, 2021, the entire contents of which are incorporated herein by reference.

BACKGROUND OF THE INVENTION

1. Field of the Invention

Embodiments described herein relate generally to a medical device for removing an object in a body cavity.

2. Description of the Related Art

Examples of treatment methods for a stenosed site caused by plaque, a thrombus, and the like in a blood vessel include a method of dilating the blood vessel by a balloon and a method of indwelling a mesh-like or coil-like stent in the blood vessel as a support for the blood vessel. However, it is difficult by these methods to treat a stenosed site that is hardened due to calcification, and a stenosed site that occurs in a bifurcated portion of the blood vessel. Examples of a method that can treat such sites include a method of cutting and removing stenotic objects such as plaque and a thrombus.

As medical devices to be used in such a treatment, a medical device with a cutting unit that rotates to cut an object in a blood vessel has been known. The medical device with the cutting unit includes a drive shaft including the cutting unit in a distal end portion, and a fluid lumen that aspirates the cut object. The drive shaft is connected to a rotation drive source such as a motor, and the fluid lumen is connected to a fluid drive source such as a pump.

SUMMARY OF THE INVENTION

When the medical device is inserted into a body cavity, there is a possibility that an operation may start in a state where the cutting unit is not positioned in a lesion area. Accordingly, there is a demand that the cutting unit does not operate in areas other than the lesion area.

Embodiments provide a medical device capable of preventing a cutting unit from operating in areas other than a lesion area.

In one embodiment, a medical device for removing an object in a body cavity, includes a rotatable drive shaft, a cutter attached to a distal end of the drive shaft and by which the object is cut, a guide wire including one or more markers, a guide tube disposed at a distal portion of the drive shaft and including a lumen through which the guide wire can pass and a sensor configured to detect the one or more markers, and a controller configured to control an operation state of the cutter to be an operation disabled state in which the cutter cannot operate and an operation enabled state in which the cutter can operate, and to switch between the operation disabled state and the operation enabled state according to the one or more markers detected by the sensor.

The medical device configured above can prevent the cutting unit from suddenly starting the operation.

DESCRIPTION OF THE EMBODIMENTS

Figure 1:
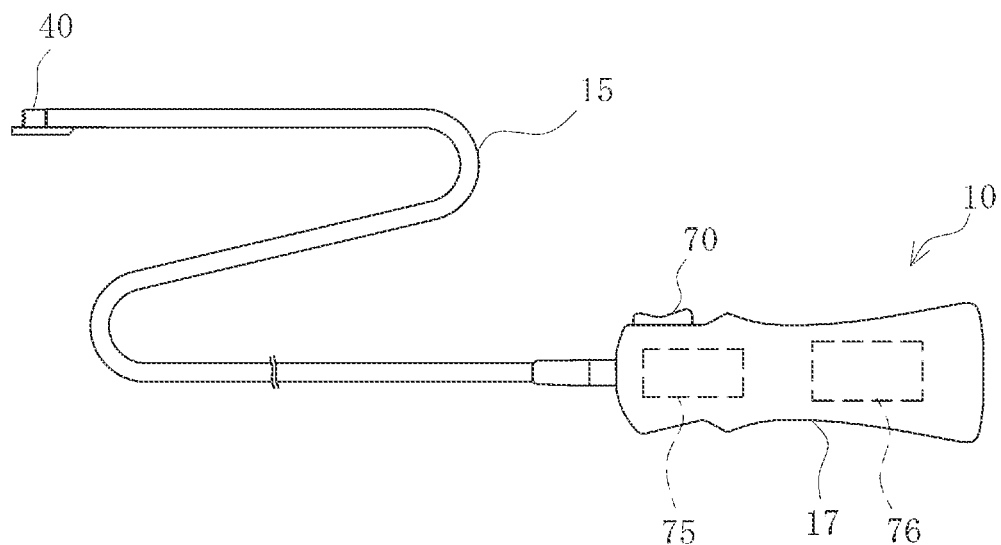
FIG. 1 is a front view of a medical device in an embodiment.

Hereinafter, embodiments of this disclosure will be described with reference to the drawings. Note that, the size ratios in the drawings may be exaggerated for convenience of explanation, and may be different from the actual ratios in some cases. In the present specification, a side of a medical device to be inserted into a body cavity is referred to as a "distal end" or a "distal side", and an operator-side at which the medical device 10 is held by an operator is referred to as a "proximal end" or a "proximal side".

A medical device 10 according to an embodiment is inserted into a blood vessel, and is used in a procedure of cutting and removing a thrombus, plaque, atheroma, a calcified lesion, and the like, in acute limb ischemia and a deep venous thrombosis. Note that, an object to be removed by the medical device 10 is not necessarily limited to the thrombus, the plaque, the atheroma, and the calcified lesion, and can be any object that may exist in a body cavity.

Figure 2:
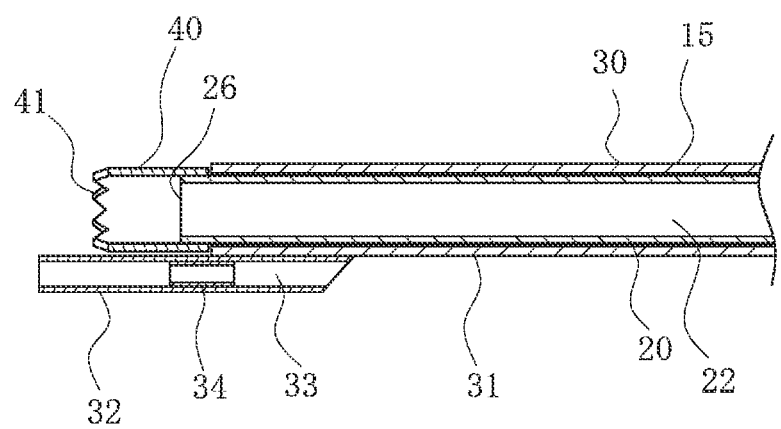
FIG. 2 is an enlarged cross-sectional view of the vicinity of a distal end portion of the medical device.

As illustrated in FIGS. 1 and 2, the medical device 10 includes a shaft portion 15 including an elongated drive shaft 20 that is rotationally driven, and an outer tube 30 that surrounds the drive shaft 20. A handle portion 17 is connected to a proximal portion of the shaft portion 15. A cutting unit 40 that cuts an object such as a thrombus is provided at a distal end portion of the drive shaft 20.

The drive shaft 20 transmits a rotation force to the cutting unit 40. In the drive shaft 20, a fluid lumen 22 for transporting a cut object to the proximal side is formed. The drive shaft 20 penetrates through the outer tube 30, and has the distal end portion to which the cutting unit 40 is fixed. The drive shaft 20 includes an inlet portion 26 into which debris (e.g., a cut thrombus or the like) that is an object to be aspirated enters, at the distal end.

In the handle portion 17, an operation unit 70 (e.g., one or more switches) with which an operation of the medical device 10 is performed is provided. Moreover, inside the handle portion 17, a rotation drive source 75 (e.g., a motor) that is connected to the shaft portion 15 and rotates the drive shaft 20, and an aspiration drive source 76 (e.g., a pump) that moves a fluid from the distal side to the proximal side of the fluid lumen 22 are provided.

The drive shaft 20 is flexible, and has characteristics of allowing the power of rotation acting from the proximal side to be transmitted to the distal side. The drive shaft 20 may include one member as a whole, or may include a plurality of members. The drive shaft 20 may include a spiral-shaped slit or groove to be formed by laser processing or the like, in order to adjust the rigidity thereof depending on a site. Moreover, the distal end portion and the proximal portion of the drive shaft 20 may include different members. Moreover, the drive shaft 20 may only have a function of allowing the power in the axial direction acting from the proximal side to be transmitted to the distal side.

As a constituent material for the drive shaft 20, for example, stainless steel, a shape memory alloy such as a nickel titanium alloy, an alloy (e.g., silver solder component) including silver, copper, zinc, and the like, an alloy (e.g., solder component) including gold, tin, and the like, cemented carbide such as tungsten carbide, polyolefin such as polyethylene and polypropylene, polyamide, polyester such as polyethylene terephthalate, a fluorinated polymer such as tetrafluoroethylene ethylene copolymer (ETFE), polyether ether ketone (PEEK), polyimide, and the like can be used suitably. Moreover, the drive shaft 20 may include a plurality of materials, or a reinforcing member such as a wire rod may be embedded.

The outer tube 30 includes an outer tube main body 31 that surrounds the drive shaft 20 that is rotatable, and a distal end tube 32 that is fixed to a side surface of a distal end portion of the outer tube main body 31 and serves as a guide tube.

The distal end portion of the outer tube main body 31 is positioned on a proximal side of the cutting unit 40. The outer tube main body 31 is also rotatable to change the orientation of the cutting unit 40 toward an object to be removed. Moreover, the outer tube main body 31 may include a curved portion that is bent at a predetermined angle in the distal end portion. The curved portion is rotated by the outer tube main body 31, and thus can easily cause the cutting unit 40 to contact the object to be removed.

The distal end tube 32 is fixed to an outer peripheral surface of the distal end portion of the outer tube main body 31. The distal end tube 32 includes a distal end lumen 33 into which a guide wire 50 serving as a second device can be inserted. Accordingly, the medical device 10 is a rapid exchange type device in which the distal end lumen 33 through which the guide wire 50 is inserted is formed only in the distal end portion.

In the distal end tube 32, a sensor 34 is provided. The sensor 34 can detect a marker portion of the guide wire 50, which is described later.

Constituent materials for the outer tube main body 31 and the distal end tube 32 are not specially limited, and for example, stainless steel, a shape memory alloy such as a nickel titanium alloy, titanium, an alloy (e.g., silver solder component) including silver, copper, zinc, and the like, an alloy (e.g., solder component) including gold, tin, and the like, cemented carbide such as tungsten carbide, polyolefin such as polyethylene and polypropylene, polyamide, polyester such as polyethylene terephthalate, or various kinds of elastomers, a fluorinated polymer such as ETFE, PEEK, polyimide, polyacetal, and the like, can be used suitably. Moreover, the outer tube main body 31 may include a plurality of materials, or a reinforcing member such as a wire rod may be embedded.

The cutting unit 40 is a cutter that cuts an object such as a thrombus, plaque, or calcified lesion to be small. Accordingly, "cutting" indicates that a force acts on an object to be contacted, or an energy acts on an object approaching, thereby making the object smaller. An acting method of a force in the cutting, and the shape and form of the object after the cutting are not limited. The cutting unit 40 has an enough strength to cut the above-mentioned object. The cutting unit 40 is fixed to the distal end portion of the drive shaft 20. The cutting unit 40 has a cylinder shape so as to protrude to the distal side from the drive shaft 20. The cutting unit 40 includes a sharp blade 41 at a distal end thereof. Note that, the shape of the blade 41 is not specially limited. The cutting unit 40 may include not the blade 41 but a large number of minute grinding particles. Moreover, the cutting unit 40 does not need to be rotatable and may be a member that emits laser.

A constituent material for the cutting unit 40 preferably has a strength to the extent that allows a thrombus to be cut, and for example, stainless steel, titanium, diamond, ceramics, a shape memory alloy such as a nickel titanium alloy, cemented carbide such as tungsten carbide, an alloy (e.g., silver solder component) including silver, copper, zinc, and the like, high-speed steel, optical fiber, and the like can be used suitably. The constituent material for the cutting unit 40 may be resin such as polyether ether ketone (PEEK), or engineering plastic such as polyacetal.

Figure 3:
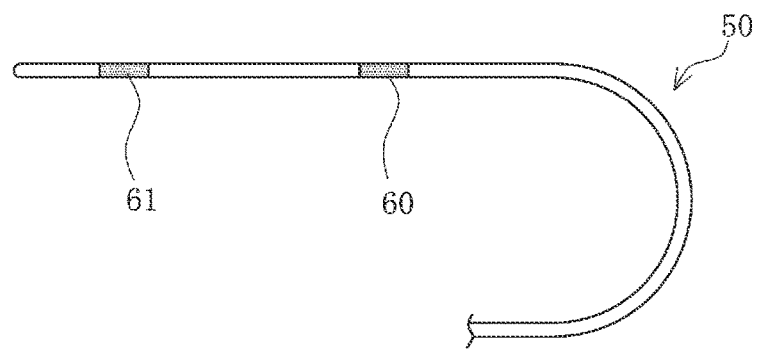
FIG. 3 is a front view of a second device included in the medical device.

As illustrated in FIG. 3, the guide wire 50 serving as a second device is an elongated wire rod having elasticity, is formed by wires being wound around a core wire. The core wire and the wound wires are formed of a metal material such as stainless steel. Note that, the guide wire 50 may be made of resin.

The guide wire 50 includes a first cutting marker portion 60 and a second cutting marker portion 61 at positions separated from each other along the axial direction in a distal portion. Each of the first cutting marker portion 60 and the second cutting marker portion 61 is configured such that when passing through the distal end lumen 33, the passing can be detected by the sensor 34.

Figure 4:
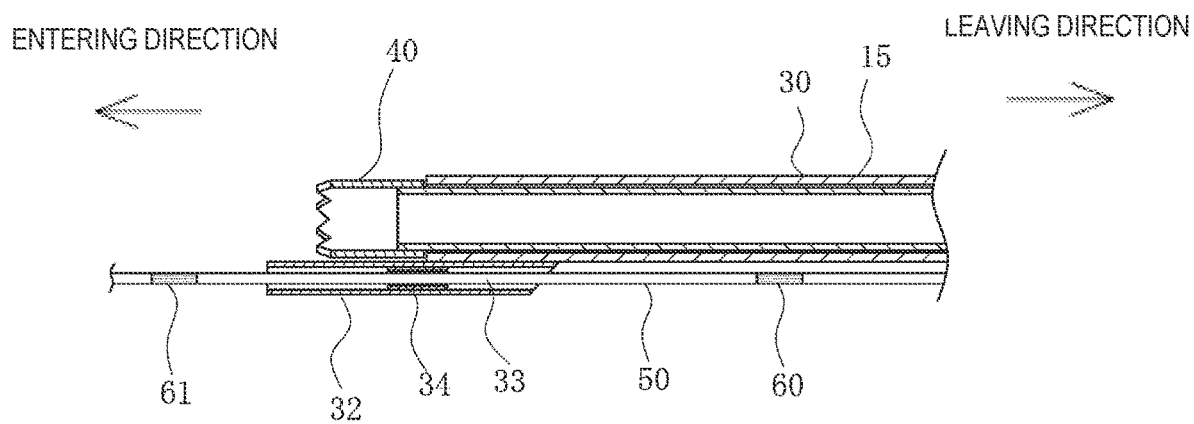
FIG. 4 is an enlarged cross-sectional view of the vicinity of the distal end portion of the medical device in a state where a shaft portion and the second device are mutually disposed to target positions in an axial direction.

Before the shaft portion 15 is inserted into a blood vessel, the guide wire 50 is inserted into the blood vessel so that a distal end portion of the guide wire 50 reaches the vicinity of a lesion area. Then, the shaft portion 15 is inserted and moved in a state where the guide wire 50 is inserted through the distal end lumen 33, so that both the shaft portion 15 and the guide wire 50 reach the target position. As illustrated in FIG. 4, in this state, the first cutting marker portion 60 is positioned on the proximal side of the distal end lumen 33, and the second cutting marker portion 61 is positioned on the distal side of the distal end lumen 33.

Figure 5:
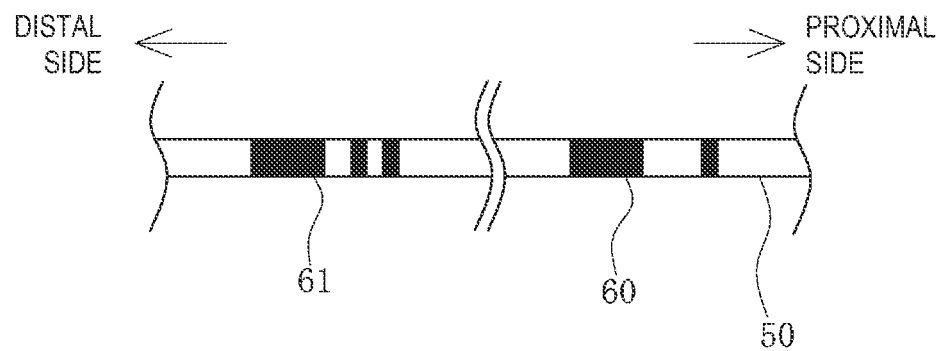
FIG. 5 is a partially enlarged front view of the second device illustrating shapes of a first cutting marker portion and a second cutting marker portion.

The sensor 34 is an optical sensor that can detect a certain pattern on an outer surface of the guide wire 50, and each of the first cutting marker portion 60 and the second cutting marker portion 61 includes such a pattern so as to be detected when moving in the axial direction. As illustrated in FIG. 5, the first cutting marker portion 60 includes one short line at the proximal side and one long line at the distal side. Moreover, the second cutting marker portion 61 includes two short lines at the proximal side and one long line at the distal side.

The sensor 34 is moved from the proximal side toward the distal side as the shaft portion 15 is moved towards the target position (hereinafter referred to as the entering direction). In this case, after having passed the short line at the proximal side in the first cutting marker portion 60, the sensor 34 passes the long line at the distal side. When the shaft portion 15 is moved away from the target position (hereinafter referred to as the leaving direction), after having passed the long line at the distal side in the first cutting marker portion 60, the sensor 34 passes the short line at the proximal side. Therefore, in a case where the sensor 34 has detected a long line after having detected a short line, the sensor 34 has passed the first cutting marker portion 60 in the entering direction. In a case where the sensor 34 has detected a short line after having detected a long line, the sensor 34 has passed the first cutting marker portion 60 in the leaving direction. Accordingly, the sensor 34 can detect the moving direction thereof (i.e., the moving direction of the shaft portion 15) by detecting a pattern formed on the first cutting marker portion 60.

The short lines are disposed at the proximal side and the long line is disposed at the distal side also in the second cutting marker portion 61, so as to determine in which direction the sensor 34 has passed the second cutting marker portion 61. Moreover, the sensor 34 can distinguish the second cutting marker portion 61 from the first cutting marker portion 60 by detecting the number of short lines.

Figure 6:
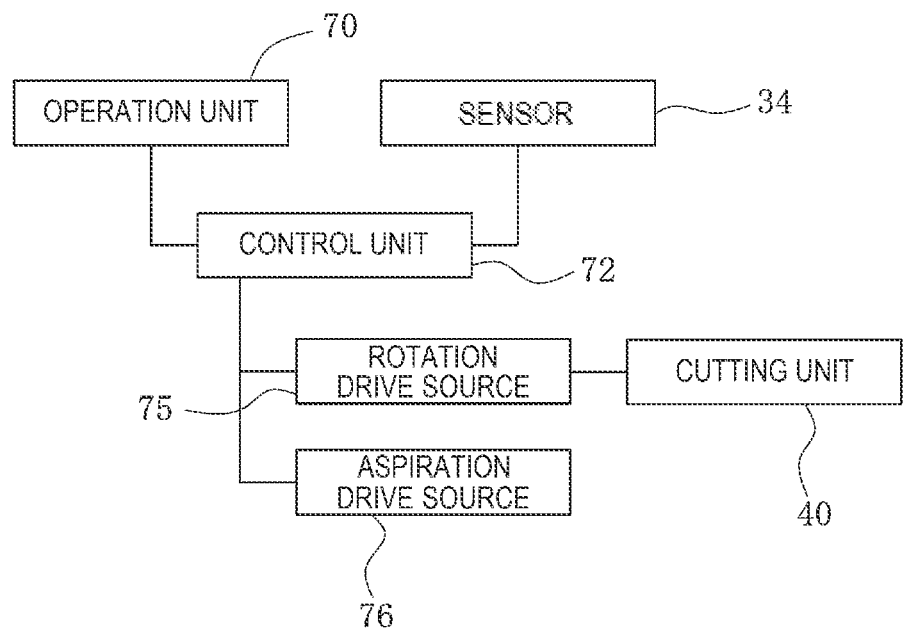
FIG. 6 is a hardware block diagram of the medical device.

As illustrated in FIG. 6, the medical device 10 includes a control unit 72 that is a control circuit or a processor connected to the operation unit 70 and the sensor 34. The control unit 72 is connected to the rotation drive source 75 and the aspiration drive source 76, and controls the operations thereof based on information from the operation unit 70 and the sensor 34. The rotation drive source 75 can cause the cutting unit 40 to rotationally operate via the drive shaft 20 as mentioned in the foregoing.

Figure 7:
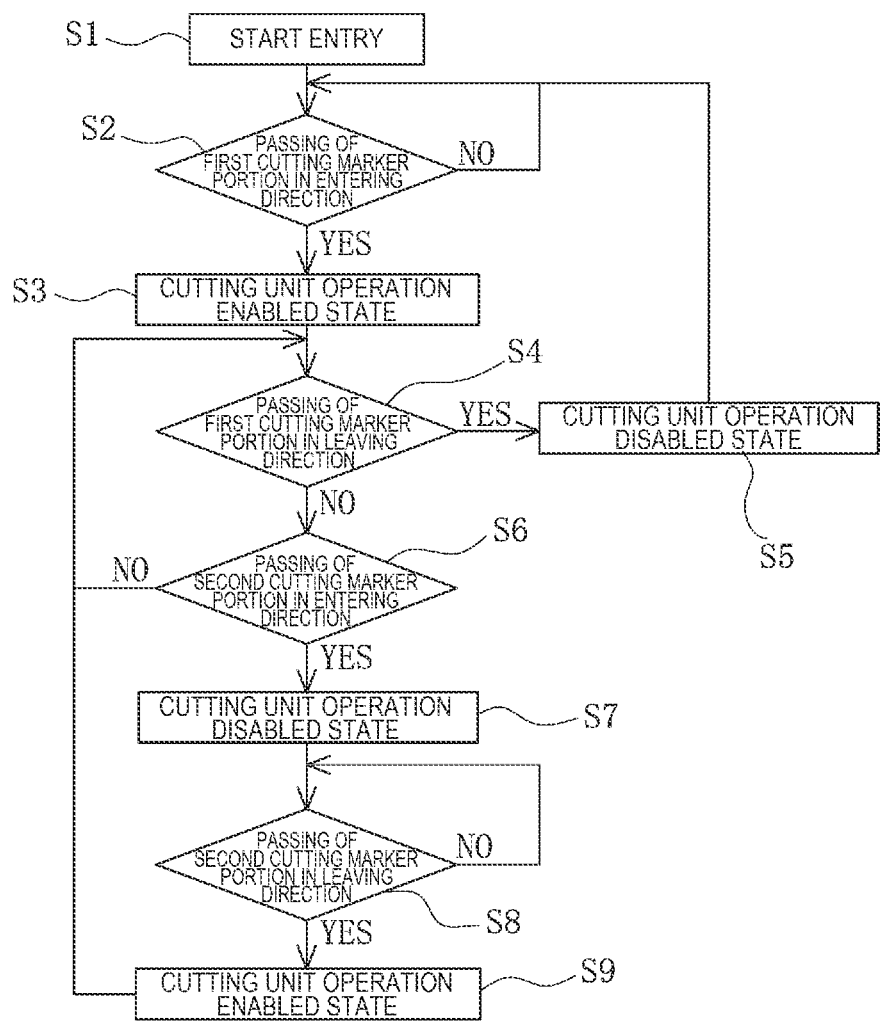
FIG. 7 is a flowchart illustrating an operation of a control unit.

The operation control of the cutting unit 40 by the control unit 72 will be described. As illustrated in FIG. 7, firstly, the shaft portion 15 in which the guide wire 50 is inserted through the distal end lumen 33 starts to enter a blood vessel (S1). When the insertion of the shaft portion 15 is started, the control unit 72 causes the cutting unit 40 to be an operation disabled state. The operation disabled state of the cutting unit 40 indicates a state where even when an operator operates the operation unit 70 so as to drive the rotation drive source 75, the driving of the rotation drive source 75 is not started, and the cutting unit 40 is not caused to rotate. Moreover, in a case where the operation state switches to the operation disabled state while the cutting unit 40 is rotating, the rotation of the cutting unit 40 is automatically stopped.

The control unit 72 waits until the sensor 34 detects the passing of the first cutting marker portion 60 when moving in the entering direction (S2), and switches the operation state of the cutting unit 40 from the operation disabled state to the operation enabled state when the sensor 34 has passed the first cutting marker portion 60 in the entering direction (S3). In the operation enabled state of the cutting unit 40, the operator can operate the operation unit 70 to drive the rotation drive source 75, thereby causing the cutting unit 40 to rotate.

The control unit 72 causes the cutting unit 40 to be in the operation disabled state until the sensor 34 detects the passing of the first cutting marker portion 60 that is positioned in the vicinity of a lesion area when moving in the entering direction, so that even in a case where the operation unit 70 is suddenly operated by the operator in the middle of the entry of the cutting unit 40 in the blood vessel, the operation of the cutting unit 40 is not started. Accordingly, the operation of the cutting unit 40 in areas other than the vicinity of the lesion area can be prevented.

After the sensor 34 has passed the first cutting marker portion 60 in the entering direction, the control unit 72 determines whether the sensor 34 has detected the first cutting marker portion 60 when moving in the leaving direction (S4). If the sensor 34 has detected the first cutting marker portion 60 when moving in the leaving direction, the control unit 72 switches the operation state of the cutting unit 40 to the operation disabled state (S5). Accordingly, in a case where the shaft portion 15 has temporarily entered the vicinity of the lesion area and then has moved in the leaving direction, the cutting unit 40 can be prevented from rotating. After S5, the control returns to S2, the control unit 72 determines whether the sensor 34 detects the first cutting marker portion 60 when moving in the entering direction.

If the sensor 34 has not detected the first cutting marker portion 60 when moving in the leaving direction at S4, the control unit 72 determines whether the sensor 34 has detected the second cutting marker portion 61 when moving in the entering direction (S6). If the sensor 34 has detected the second cutting marker portion 61 when moving in the entering direction, the control unit 72 switches the operation state of the cutting unit 40 to the operation disabled state (S7). Accordingly, in a case where the shaft portion 15 has entered the blood vessel more than necessary, the rotation of the cutting unit 40 can be stopped. If the sensor 34 has not detected the second cutting marker portion 61 when moving in the entering direction at S6, the control returns to S5.

After S7, the control unit 72 determines whether the sensor 34 has detected the second cutting marker portion 61 when moving in the leaving direction (S8). If the sensor 34 has detected the second cutting marker portion 61 when moving in the leaving direction, the control unit 72 switches the operation state of the cutting unit 40 to the operation enabled state (S9). Accordingly, when the shaft portion 15 has temporarily entered the blood vessel more than necessary, and then has moved back to the vicinity of the lesion area, the cutting unit 40 can be operated. After S9, the control returns to S4, the control unit 72 determines whether the sensor 34 has detected the first cutting marker portion 60 when moving in the leaving direction.

With the control in the foregoing, the cutting unit 40 is in the operation enabled state in a case where the sensor 34 is positioned in an area between the first cutting marker portion 60 and the second cutting marker portion 61, and is in the operation disabled state in a case where the sensor 34 is positioned outside of the area. The guide wire 50 is inserted into the blood vessel such that a lesion area is positioned between the first cutting marker portion 60 and the second cutting marker portion 61, so that the cutting unit 40 can be operable only in a case where the cutting unit 40 is positioned in the vicinity of the lesion area. Accordingly, where the cutting unit 40 is positioned in an area other than the vicinity of the lesion area, the operation thereof can be prevented from suddenly starting.

Figure 8:
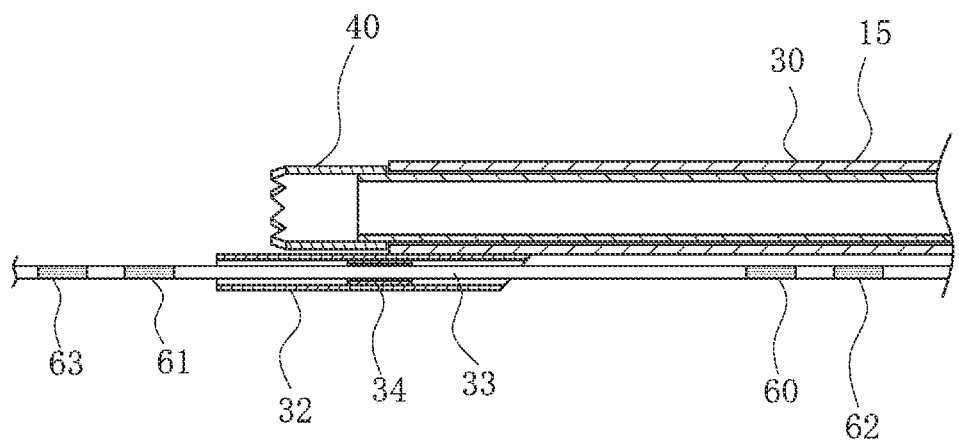
FIG. 8 is an enlarged cross-sectional view of the vicinity of a distal end portion of a medical device according to a modification example.

A modification example of the medical device 10 having additional marker portions will be described. As illustrated in FIG. 8, the guide wire 50 includes a first aspiration marker portion 62 on the proximal side of the first cutting marker portion 60. Moreover, the guide wire 50 includes a second aspiration marker portion 63 on the distal side of the second cutting marker portion 61. Each of the first aspiration marker portion 62 and the second aspiration marker portion 63 is configured such that the passing direction can be determined by the sensor 34, and can be distinguished from the other marker portions 60 and 61.

Figure 9:
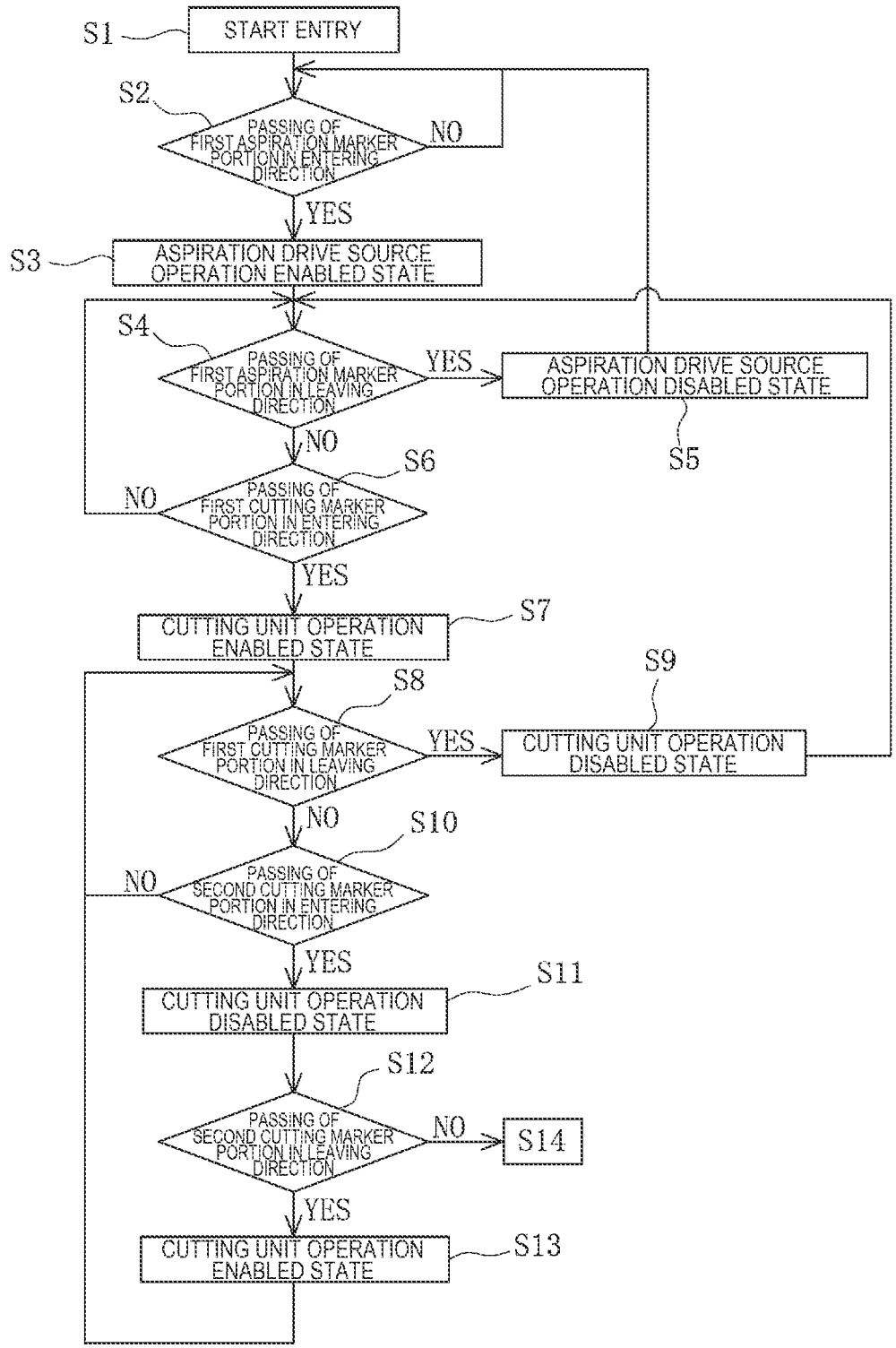
FIG. 9 is a first half part of a flowchart illustrating an operation of a control unit of the medical device according to the modification example.
Figure 10:
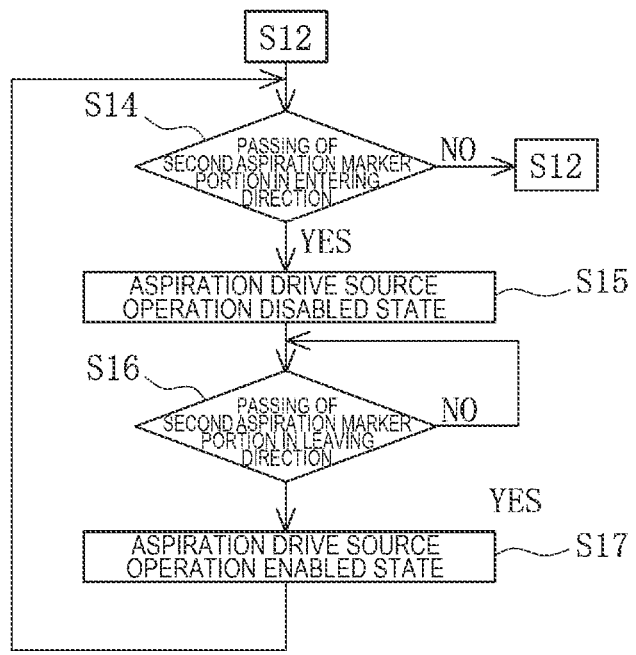
FIG. 10 is a latter half part of the flowchart illustrating the operation of the control unit of the medical device according to the modification example.

Before the shaft portion 15 is inserted into the blood vessel, the control unit 72 causes the aspiration drive source 76 to be in the operation disabled state. As illustrated in FIGS. 9 and 10, when the shaft portion 15 is moved from the proximal side toward the distal side of the guide wire 50, if the sensor 34 has detected the first aspiration marker portion 62 when moving in the entering direction (S2), the control unit 72 switches the operation state of the aspiration drive source 76 from the operation disabled state to the operation enabled state (S3). At this time, the control unit 72 may cause the aspiration drive source 76 to automatically start to operate.

If the sensor 34 has detected the first aspiration marker portion 62 when moving in the leaving direction (S4), the control unit 72 switches the operation state of the aspiration drive source 76 to the operation disabled state (S5). The shaft portion 15 is further moved toward the distal side from at S2, and if the sensor 34 has detected the first cutting marker portion 60 when moving in the entering direction (S6), the control unit 72 switches the operation state of the cutting unit 40 from the operation disabled state to the operation enabled state (S7). At this time, the control unit 72 may cause the cutting unit 40 to automatically start to operate. The first aspiration marker portion 62 is positioned on the proximal side of the first cutting marker portion 60, so that when the shaft portion 15 has moved toward the distal side, the aspiration drive source 76 becomes the operation enabled state due to the first aspiration marker portion 62, and the cutting unit 40 thereafter becomes the operation enabled state due to the first cutting marker portion 60. Accordingly, an object generated by the cutting can be reliably aspirated.

From the state where the sensor 34 is positioned at the distal side from the first cutting marker portion 60, the shaft portion 15 is moved toward the proximal side, and if the sensor 34 has detected the first cutting marker portion 60 when moving in the leaving direction (S8), the control unit 72 switches the operation state of the cutting unit 40 from the operation enabled state to the operation disabled state (S9). At this time, the control unit 72 may cause the cutting unit 40 to automatically stop. Thereafter, the operations from at S4 are repeated.

From the state where the sensor 34 is positioned on the distal side of the first cutting marker portion 60, the shaft portion 15 is further moved toward the distal side, and if the sensor 34 has detected the second cutting marker portion 61 when moving in the entering direction (S10), the control unit 72 switches the operation state of the cutting unit 40 from the operation enabled state to the operation disabled state (S11). At this time, the control unit 72 may cause the cutting unit 40 to automatically stop. If the sensor 34 has detected the second cutting marker portion 61 when moving in the leaving direction (S12), the control unit 72 switches the operation state of the cutting unit 40 to the operation enabled state (S13).

After S11, when the shaft portion 15 is further moved to the distal side and the sensor 34 has detected the second aspiration marker portion 63 when moving in the entering direction (S14), the control unit 72 switches the operation state of the aspiration drive source 76 from the operation enabled state to the operation disabled state (S15). At this time, the control unit 72 may cause the aspiration drive source 76 to automatically stop.

After S15, when the shaft portion 15 is moved toward the proximal side and the sensor 34 has detected the second aspiration marker portion 63 when moving in the leaving direction (S16), the control unit 72 switches the operation state of the aspiration drive source 76 from the operation disabled state to the operation enabled state (S17). At this time, the control unit 72 may cause the aspiration drive source 76 to automatically start to operate.

In this manner, with the first aspiration marker portion 62 and the second aspiration marker portion 63, the operation disabled state and the operation enabled state of the aspiration drive source 76 may be switched.

Figure 11:
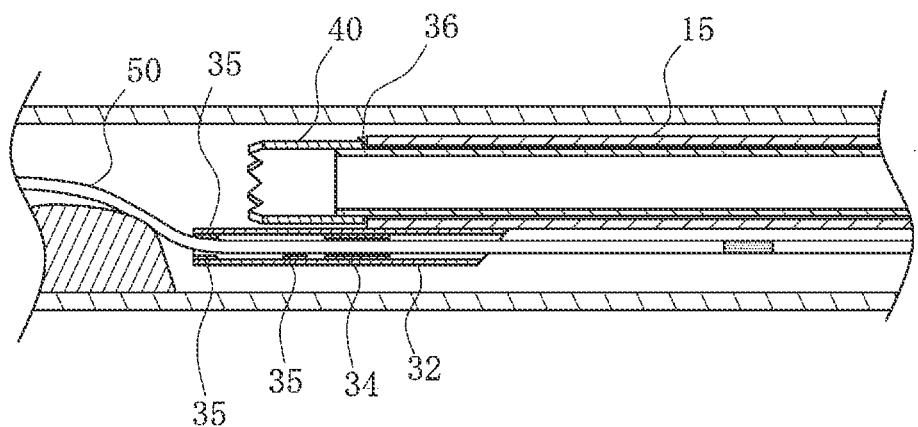
FIG. 11 is an enlarged cross-sectional view of the vicinity of a distal end portion in a state where a medical device according to another modification example is disposed in the vicinity of a lesion area.

Next, another modification example of the medical device 10 will be described. As illustrated in FIG. 11, a plurality of contact sensors 35 and 36 that detect a contact state of the cutting unit 40 are provided in the vicinity of the distal end of the shaft portion 15. The contact sensors 35 are disposed at a distal side opening portion of the distal end tube 32 and at an intermediate portion of the distal end lumen 33. Moreover, the contact sensor 36 is also provided in a gap between the cutting unit 40 and the outer tube 30. For example, the contact sensors 35 and 36 are pressure sensors.

The contact sensor 35 provided in the distal end tube 32 detects a pressure and outputs a value equal to or greater than a threshold in a case where the guide wire 50 at the distal side from the distal end tube 32 is largely bent by an obstacle in a lesion area or the like. In this case, it can be determined that the lesion area is unevenly distributed at a side of the distal end tube 32, and the cutting unit 40 is in a state of not being in contact with the lesion area. Thus, the control unit 72 causes the cutting unit 40 to be in the operation disabled state. The operator rotates the shaft portion 15 in a circumferential direction, for example, to dispose the distal end tube 32 at a position in the circumferential direction different from the lesion area, until the value output by the contact sensor 35 of the distal end tube 32 falls within a normal range. If the value output by the contact sensor 35 of the distal end tube 32 falls within the normal range, the control unit 72 switches the operation state of the cutting unit 40 from the operation disabled state to the operation enabled state.

The contact sensor 36 provided between the cutting unit 40 and the outer tube 30 detects a pressure and outputs a value equal to or greater than a threshold in a case where the cutting unit 40 is in contact with a hard site such as a lesion area. In this case, the control unit 72 causes the cutting unit 40 to be in the operation enabled state. In a case where the contact sensor 36 outputs a value lower than the threshold, it can be determined that the cutting unit 40 is not in contact with the lesion area. Thus, the control unit 72 causes the cutting unit 40 to be in the operation disabled state. Only in the case where it has been determined that the cutting unit 40 is in contact with the lesion area by the contact sensors 35 and 36, it is possible to cause the cutting unit 40 to operate, and prevent the operation of the cutting unit 40 in another site.

The contact sensors 35 and 36 may be disposed at any positions other than the distal end tube 32 or between the cutting unit 40 and the outer tube 30. For example, the contact sensors 35 and 36 may be provided on a protector (not illustrated) that is provided at the distal end portion of the shaft portion 15.

As is in the foregoing, the medical device 10 according to the present embodiment includes: the elongated shaft portion 15; the cutting unit 40 that is provided in a distal end portion of the shaft portion 15; the distal end tube 32 that is provided to the shaft portion 15, and includes the distal end lumen 33; the control unit 72 that switches an operation enabled state and an operation disabled state of the cutting unit 40; and the guide wire 50 that is inserted through the guide tube 32, in which the guide wire 50 includes the first cutting marker portion 60, the distal end lumen 33 includes the sensor 34 capable of detecting passing of the first cutting marker portion 60 in an axial direction, and the control unit 72 causes the cutting unit 40 to be in the operation disabled state until the sensor 34 detects the first cutting marker portion 60, and causes the cutting unit 40 to be in the operation enabled state when the sensor 34 detects the first cutting marker portion 60, again. The medical device 10 configured in this manner can prevent the cutting unit 40 from suddenly starting its operation.

Moreover, the first cutting marker portion 60 allows the sensor 34 to detect a moving direction of the sensor 34 or the shaft portion 15 with respect to the guide wire 50 (i.e., the entering or leaving direction). The control unit 72 may switch the operation state of the cutting unit 40 from the operation disabled state to the operation enabled state when the sensor 34 has detected the first cutting marker portion 60 when the shaft portion 15 is being moved in the entering direction, and may switch the operation state of the cutting unit 40 from the operation enabled state to the operation disabled state when the sensor 34 has detected the first cutting marker portion 60 when the shaft portion 15 is being moved in the leaving direction. Accordingly, it is possible to appropriately control the state of the cutting unit 40 in accordance with a direction along which the shaft portion 15 is moved by the operator.

Moreover, the control unit 72 may automatically start the operation of the cutting unit 40 when switching the operation state of the cutting unit 40 from the operation disabled state to the operation enabled state, and may automatically stop the operation of the cutting unit 40 when switching the operation state of the cutting unit 40 from the operation enabled state to the operation disabled state. Accordingly, it is possible to automatically start the operation when the cutting unit 40 has approached a lesion area, and automatically stop the operation when the cutting unit 40 has moved away the lesion area.

Moreover, the guide wire 50 may include the second cutting marker portion 61 on the distal side of the first cutting marker portion 60. The second cutting marker portion 61 is positioned at the distal side from the distal end lumen 33 in a state where both the shaft portion 15 and the guide wire 50 are disposed at the target positions in the axial direction, and the control unit 72 may switch the operation state of the cutting unit 40 from the operation enabled state to the operation disabled state when the sensor 34 has detected the second cutting marker portion 61. Accordingly, in a case where the shaft portion 15 has excessively advanced in the entering direction, it is possible to appropriately stop the operation of the cutting unit 40.

Moreover, the first cutting marker portion 60 can be distinguished from the second cutting marker portion 61 by their different patterns. Accordingly, it is possible to reliably detect the cutting unit 40 being present within a certain range in the axial direction.

Moreover, the aspiration drive source 76 that aspirates a cut object from the distal end portion of the shaft portion 15 may be further included, and the guide wire 50 may include the first aspiration marker portion 62 on the proximal side of the first cutting marker portion 60. The control unit 72 may cause the aspiration drive source 76 to be in the operation disabled state until the sensor 34 detects the first aspiration marker portion 62, and may cause the aspiration drive source 76 to be in the operation enabled state when the sensor 34 has detected the first aspiration marker portion 62. Accordingly, it is possible to cause the aspiration drive source 76, in addition to the cutting unit 40, to be operable in a case where the shaft portion 15 has entered beyond the certain range, and to prevent the aspiration drive source 76 from suddenly operating in the other ranges.

Moreover, the guide wire 50 may include the second aspiration marker portion 63 on the distal side of the second cutting marker portion 61. The second aspiration marker portion 63 is positioned at the distal side from the distal end lumen 33 in a state where both the shaft portion 15 and the guide wire 50 are disposed at the target positions in the axial direction. The control unit 72 may switch the operation state of the aspiration drive source 76 from the operation enabled state to the operation disabled state when the sensor 34 has detected the second aspiration marker portion 63. Accordingly, in a case where the shaft portion 15 has excessively advanced in the entering direction, it is possible to appropriately stop the operation of the aspiration drive source 76.

Moreover, the distal end tube 32 forming the shaft portion 15 or the distal end lumen 33 may include the contact sensor 35 that detects a contact state of the cutting unit 40, and the control unit 72 may switch the operation state of the cutting unit 40 from the operation enabled state to the operation disabled state when the contact sensor 35 has detected that the cutting unit 40 is in contact with an area other than the lesion area. Accordingly, it is possible to prevent the cutting unit 40 from suddenly starting the operation in a state where the cutting unit 40 is not in contact with the lesion area.

Note that, this disclosure is not limited to the above-described embodiments or modifications, and various changes by those skilled in the art can be made within the technical scope of this disclosure.

The control unit 72 may immediately cause the cutting unit 40 to be in the operation disabled state in a case of having detected a certain condition. Examples of the certain condition can include: (a) a case where during the rotation of the cutting unit 40, the rotational frequency is lowered than a threshold, (b) a case where during the rotation of the cutting unit 40, torque of the drive shaft 20 has increased higher than a threshold, and (c) in a case where a forced stop switch to be provided in the operation unit 70 is operated.

The control unit 72 can cause the cutting unit 40 to be in the operation enabled state only within a preset time range after the activation, and may cause the cutting unit 40 to be in the operation disabled state outside of the preset time range. Accordingly, it is possible to cause the cutting unit 40 to operate only within the certain time range.

The medical device 10 may include a distal-side blood pressure sensor that is disposed on the distal side of a lesion area, and a proximal-side blood pressure sensor that is disposed at the proximal side of the lesion area. The distal-side blood pressure sensor and the proximal-side blood pressure sensor can be attached to the guide wire 50, for example. The control unit 72 calculates a ratio of the blood pressure from a measurement value by the distal-side blood pressure sensor and a measurement value by the proximal-side blood pressure sensor, and causes the cutting unit 40 to be in the operation enabled state in a case where the ratio is smaller than a certain threshold, and switches the cutting unit 40 to being in the operation disabled state when the ratio of the blood pressure has reached the threshold and stops the operation of the cutting unit 40. Accordingly, it is possible to automatically stop the operation of the cutting unit 40 when the cutting of the lesion area that occludes a blood vessel is progressed.

The sensor 34 only needs to be able to detect the marker portions 60-63 of the guide wire 50, and is not limited to the optical sensor. For example, a magnetic body is disposed in each marker portion, and the sensor 34 may be a magnetic sensor to detect the magnetic body. Moreover, a protrusion is provided to the marker portion, and the sensor 34 may be a pressure sensor that can detect the protrusion. Moreover, the sensor 34 may have a curved shape along an inner surface of the distal end lumen 33 serving as the guide tube, may have a ring shape or a flat plate shape.

The marker portions 60-63 may be distinguishable from each other by other means other than the patterns. For example, the marker portions 60-63 have different lengths in the axial direction. Moreover, the marker portions 60-63 have different colors, so as to be distinguishable from each other.

In the above-mentioned examples, the operator operates the medical device 10 to guide the cutting unit 40 to the lesion area, and cause the cutting unit 40 to operate, but this disclosure may be applied to a robot catheter that automatically conducts these operations.

In the above-mentioned examples, the distal end tube 32 is provided at the distal end portion of the shaft portion 15, but the distal end tube 32 may be a lumen of the shaft portion 15, or a tubular guide tube may be provided in the lumen of the shaft portion 15.

In the above-mentioned examples, the shaft portion 15 is moved from the proximal side to the distal side to perform cutting by the cutting unit 40, but the shaft portion 15 may be moved from the distal side to the proximal side to perform cutting by the cutting unit 40. In other words, when the distal portion of the medical device 10 is guided to the vicinity of the lesion area in a state where the power supply for driving the cutting unit 40 is interrupted, and after the distal end tube 32 is disposed on the distal side of the lesion area on the guide wire 50, the power supply for driving the cutting unit 40 is turned on to move the cutting unit 40 from the distal side to the proximal side of the lesion area, whereby the cutting may be performed. In this case, the first cutting marker portion 60 is positioned on the distal side of the distal end tube 32 in a state where both the shaft portion 15 and the second device are disposed at the target positions in the axial direction.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A medical device for removing an object in a body cavity, comprising:
    a rotatable drive shaft;
    a cutter attached to a distal end of the drive shaft and by which the object is cut;
    a guide wire including one or more markers that include a first marker, a second marker that is on a distal side of the first marker, and a third marker that is on a distal side of the second marker;
    a guide tube disposed at a distal portion of the drive shaft and including a lumen through which the guide wire can pass and a sensor configured to detect the one or more markers; and
    a controller configured to control an operation state of the cutter to be an operation disabled state in which the cutter cannot operate and an operation enabled state in which the cutter can operate, and to switch between the operation disabled state and the operation enabled state according to the one or more markers detected by the sensor, wherein
    the controller is configured to:
        switch the operation state of the cutter from the operation disabled state to the operation enabled state when the sensor detects the first marker before detecting the second marker, and
        switch the operation state of the cutter from the operation enabled state to the operation disabled state when the sensor detects the third marker after detecting the second marker.

2. The medical device according to claim 1, wherein the controller is configured to switch the operation state of the cutter from the operation enabled state to the operation disabled state when the sensor detects the first marker after detecting the second marker.

3. The medical device according to claim 1, wherein the controller is further configured to control the cutter to operate when the operation state of the cutter switches from the operation disabled state to the operation enabled state, and control the cutter to stop when the operation state of the cutter switches from the operation enabled state to the operation disabled state.

4. The medical device according to claim 1, wherein the third marker is separated from the second marker by a particular length that is longer than a length of the guide tube.

5. The medical device according to claim 1, wherein
    the one or more markers include a fourth marker that is on a proximal side of the third marker, and
    the controller is configured to switch the operation state of the cutter from the operation enabled state to the operation disabled state when the sensor detects the second marker, the fourth marker, and the third marker in this order.

6. The medical device according to claim 5, wherein the controller is configured to switch the operation state of the cutter from the operation disabled state to the operation enabled state when the sensor detects the fourth marker after detecting the third marker.

7. The medical device according to claim 1, further comprising:
    an aspiration pump configured to aspirate the cut object through a lumen inside the drive shaft, wherein
    the controller is configured to control an operation state of the aspiration pump to be an operation disabled state in which the aspiration pump cannot operate and an operation enabled state in which the aspiration pump can operate, and to switch between the operation disabled state and the operation enabled state according to the one or more markers detected by the sensor.

8. The medical device according to claim 7, wherein
    the one or more markers include a fifth marker that is on a proximal side of the first marker, and
    the controller is configured to switch the operation state of the aspiration pump from the operation disabled state to the operation enabled state when the sensor detects the fifth marker before detecting the first marker.

9. The medical device according to claim 8, wherein
    the one or more markers include a sixth marker that is on a distal side of the third marker, and
    the controller is configured to switch the operation state of the aspiration pump from the operation enabled state to the operation disabled state when the sensor detects the sixth marker after detecting the fifth marker.

10. The medical device according to claim 1, further comprising:
  a contact sensor disposed at at least one of a distal end of the guide tube and the distal end of the drive shaft and configured to output a value depending on a force applied to the contact sensor, wherein
  the controller is configured to switch the operation state of the cutter from the operation enabled state to the operation disabled state when the contact sensor outputs a value greater than or equal to a threshold.

11. A medical device for removing an object in a body cavity, comprising:
  a rotatable drive shaft;
  a cutter attached to a distal end of the drive shaft and by which the object is cut;
  a guide tube disposed at a distal portion of the drive shaft and including a lumen through which a guide wire can pass;
  a sensor configured to detect one or more markers included in the guide wire, the one or more markers including a first marker, a second marker that is on a distal side of the first marker, and a third marker that is on a distal side of the second marker; and
  a controller configured to control an operation state of the cutter to be an operation disabled state in which the cutter cannot operate and an operation enabled state in which the cutter can operate, and to switch between the operation disabled state and the operation enabled state according to the one or more markers detected by the sensor, wherein
  the controller is configured to:
    switch the operation state of the cutter from the operation disabled state to the operation enabled state when the sensor detects the first marker before detecting the second marker, and
    switch the operation state of the cutter from the operation enabled state to the operation disabled state when the sensor detects the third marker after detecting the second marker.

12. The medical device according to claim 11, wherein the controller is configured to switch the operation state of the cutter from the operation enabled state to the operation disabled state when the sensor detects the first marker after detecting the second marker.

13. The medical device according to claim 11, wherein the controller is configured to control the cutter to operate when the operation state of the cutter switches from the operation disabled state to the operation enabled state, and control the cutter to stop when the operation state of the cutter switches from the operation enabled state to the operation disabled state.

14. A medical device for removing an object in a body cavity, comprising:
  a drive shaft rotatable by a motor;
  a cutter attached to a distal end of the drive shaft to be rotatable and by which the object is cut;
  a switch for operating the motor;
  a guide tube disposed at a distal portion of the drive shaft and including a lumen through which a guide wire can pass;
  a sensor configured to detect one or more markers included in the guide wire, the one or more markers including a first marker, a second marker that is on a distal side of the first marker, and a third marker that is on a distal side of the second marker; and
  a controller configured to control an operation state of the motor to be an operation disabled state in which the motor cannot operate and an operation enabled state in which the motor can operate according to the one or more markers detected by the sensor wherein
  the controller is configured to:
    switch the operation state of the motor from the operation disabled state to the operation enabled state when the sensor detects the first marker before detecting the second marker, and
    switch the operation state of the motor from the operation enabled state to the operation disabled state when the sensor detects the third marker after detecting the second marker.

* * * * *